July 27, 1954  W. A. HUNTER ET AL  2,684,692
NOISE ELIMINATOR FOR FLUID SYSTEMS
Filed Aug. 17, 1950
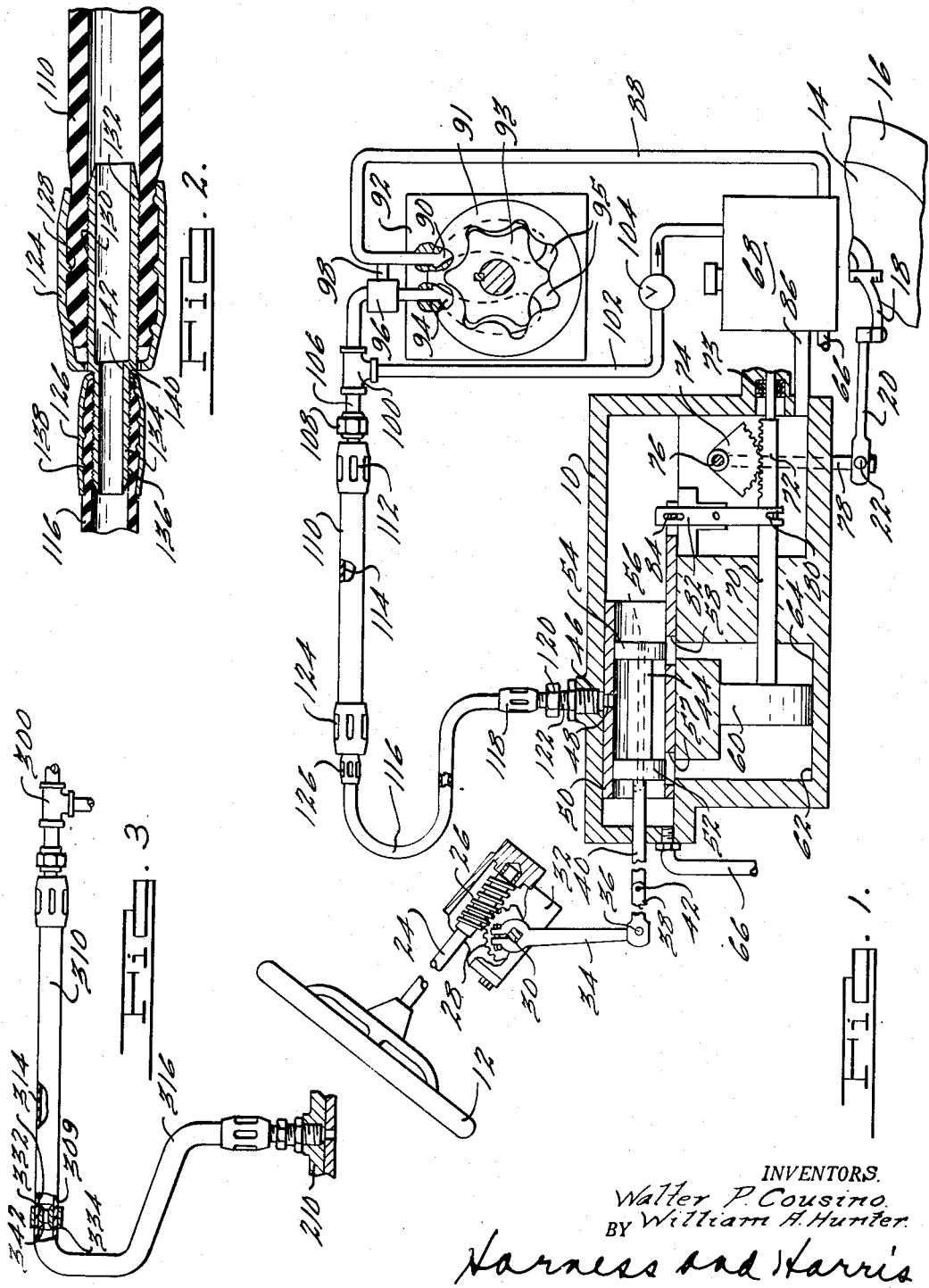
INVENTORS.
Walter P. Cousino.
BY William A. Hunter.
Harness and Harris
ATTORNEYS Patented July 27, 1954

2,684,692

UNITED STATES PATENT OFFICE 2,684,692

NOISE ELIMINATOR FOR FLUID SYSTEMS

William A. Hunter, Highland Park, and Walter P. Cousino, Detroit, Mich., assignors to Chrysler Corporation, Highland Park, Mich., a corporation of Delaware Application August 17, 1950, Serial No. 180,026

5 Claims. (Cl. 138—26)

1

The present application relates to a noise eliminator for a fluid pressure system particularly fluid pressure systems including positive displacement pumps.

It may be readily demonstrated that while a gear type pump may be found to be quiet in operation under moderate heads, the same pump will become excessively noisy when operating under high pressures say of the order of 600 to 800 pounds per square inch. One explanation advanced is that the rubber or other hose on the discharge side of the pump tends to rigidify under the high pressure and transfer pump pulses away from the pump in an undiminished state much the same as metal pipe would do. By way of eliminating this difficulty, rather satisfactory results may perhaps be obtained by the interposition of an air dome in the output hose or simply by use of a great length of hose in effort to damp out the pump pulsations; yet these approaches are generally open to the criticism of wasted space and unsightliness particularly in compact pump installations. According to a feature of the present invention, a conduit is provided between a high pressure pump and a device receiving output from the pump of which the appearance is trim yet the effectiveness is satisfactory.

According to another feature, a noise eliminator is provided for high pressure pump work which is easy to fabricate and formed of relatively inexpensive and uncomplicated parts. Moreover, little or no maintenance on the noise eliminator is required in service.

According to still another feature of the invention, a noise-eliminating conduit is provided for the outlet side of a high pressure pump which requires but small space and ordinarily only substantially the same length of hose as required to bridge the gap between the pump and the device adapted to receive the pump output.

Further features, objects, and advantages will either be specifically pointed out or become apparent when, for a better understanding of the invention, reference is made to the following description taken in conjunction with the accompanying drawings in which:

Figure 1 shows the invention applied to an hydraulic steering system;

Figure 2 is a section through the fitting forming a hose restriction; and

Figure 3 shows a modified form of hose and restriction.

In particular regard to Figure 1, the steering gear generally indicated at 10 is effective between the steering wheel 12 of a vehicle and a steerable road wheel 14 for providing power operation of the latter. Road wheel 14 is provided with a suitable tire 16 and is steered by structure including a knuckle arm 18 suitably connected to a tie rod 20. Tie rod 20 is carried at its rear end by means of a pivot 22. Steering wheel 12 is mounted to a steering column 24 having a worm portion 26. Worm 26 meshes with a toothed sector 28 suitably supported to rotate on a rock shaft 30. Fixed to rock shaft 30 for coordinated rotation with sector 28 is an arm 34 which carries a pivot 36. Moving with pivot 36 is a chain of links 38 and 40 mutually interconnected by a pin 42. Carried at one end of link 40 and rigid therewith, is a valve 44. An intake port or opening 46 in steering gear 10 is provided adjacent valve 44 and registers with an opening 48 provided in a sleeve 50 within which valve 44 is received for rectilinear movement. Valve 44 has valve parts 52 and 54 mutually spaced from one another and commonly traversed between their outer ends by an equalizing passage 56. Controlled by valve parts 52 and 54 respectively, are valve openings 57 and 58 formed in sleeve 50. By appropriate and coordinated control over valve openings 57 and 58, fluid may be bypassed around or delivered into or discharged from the chambers 62 and 64 of a cylinder in which is received a slidable piston 60. A return line 66 is provided for chamber 62 and a similar return line 86 is provided for chamber 64, both said lines effecting connection with a reservoir 68. Piston 60 is carried by a piston rod 70 having a rack 72 thereon provided with a portion slidably received in a fluidtight seal 73. A toothed sector 74 meshes with rack 72 for appropriate rotation upon a rock shaft 76 mounted in the case of steering gear 10. Fixed to shaft 76 for coordinated movement with sector 74 is an arm 78 which carries the pin 22 connected to tie rod 20 for the steering gear.

By means of a pin and slot connection 80 the piston rod 70 is linked for movement with a link 82 having at its upper end a pin and slot connection at 84 with the valve sleeve 50. Reservoir 68, into which the return lines 66 and 86 deliver pressure fluid, is provided with a suction line 88 providing a connection with the inlet port 90 of a positive displacement pump 92 which may be of the gear type. Outer and inner rotors 91 and 93 are mounted in pump 92 for eccentric rotation relative to one another, the inner rotor 93 having one less than the number of teeth or lobes of the outer rotor 91. The differential in teeth accounts for the fact that together the eccentric rotors define mutually separated chambers 95 therebetween which in effect rotate between inlet port 90 and the discharge port 94 for pump 92. Due to the rotation, fluid is trapped and transferred into the discharge port 94 against the residual pressure therein. The outlet line for discharge 94 is provided with a flow-sensitive device 96 which bypasses through a line 98, excessive fluid into suction line 88. There may be provided in the discharge line for pump 92 a T 100 connecting with a relief line 102 provided with a pressure relief valve 104 suitably returning fluid into the reservoir 68. A nipple 106 is received in T 100 to connect thereto a fitting 108 mounted to sleeve 112 firmly secured to the end of a rubber hose 110. Rubber hose 110 is especially adapted to be transversely elastic and the walls 114 thereof are suitably fabricated and proportioned to produce such an effect.

Cooperating with rubber hose 110 to provide a conduit between steering gear 10 and pump 92 is a hose 116 of manifestly smaller diameter than hose 110. Hose 116 is flexible longitudinally such as to take up the foreshortened effect of hose 110 as the latter expands transversely of itself. At one end hose 116 carries a sleeve 118, mounted to which is an end fitting 120 suitably connected by a nipple 122 to steering gear 10. The large and small hoses 110 and 116 are connected together at their inner ends by sleeves 124 and 126.

With particular respect to Figure 2, the sleeves 124 and 126 between the hose sections may be seen to be located relatively adjacent to one another. Sleeve 124 is provided with internal threads 128 for reception of the end of hose 110. An inner fitting is provided with a threaded portion 132 threaded at 130 with threads preferably of the opposite hand to threads 128. Fitting portion 132 is screwed internally into the hose 110. Appropriately connected to portion 132 by welding or soldering, is a portion 134 of the inner fitting. Portion 134 is provided with threads 136 preferably of the opposite hand, to the internal threads 138 formed on sleeve 126. Threadably received between the sleeve 126 and the inner fitting portion 134 is the end of the small hose 116.

The operation of the device of Figures 1 and 2 briefly is as follows. In response to appropriate movement of the steering wheel 12, valve 44 may be appropriately shifted to uncover relatively more of either valve openings 57 or 58 as respects inlet port 46 supplied by pump 92. Inasmuch as the steering gear 10 is of the open valve type, less fluid will tend to be bypassed around the valve opening which has been opened farther and fluid will tend to be diverted into either chamber 62 or 64 for operating piston 60. At the same time the opposite chamber for piston 60 will be opened more to discharge, either through return line 66 or 86 and the force differential due to unequal pressures existing across piston 60 will cause the piston 60 to move to operate knuckle arm 18 and the road wheel 14. Coordinated for movement with the steering of road wheel 14 is the valve sleeve 50 operated by interconnecting link 82. As the road wheel 14 responds to the movement of steering wheel 12, sleeve 50 will tend to be shifted and the steering system returned to a neutralized or re-centered position. Under the circumstances, when piston 60 is being moved under hydraulic pressure, it may be readily seen that the fluid is being introduced into the discharge port 94 of the pump by divided quantities which are separately handled in the individual chambers 94 defined by the eccentrically-mounted rotors 91 and 93. Under excessive pressures of say, the order of 600 to 800 pounds per square inch, the addition of these quantities of fluid into an ordinary pump conduit will tend to cause pulses to be transmitted directly into steering gear 10 and to be reflected by an objectionable vibratory noise. As may be noted particularly in Figure 2, however, owing to the fact that a restriction 142 is formed by the inner fitting and the fact that hose 116 is of markedly smaller diameter than hose 110, there is established a coaction tending to prevent the pulsations from being transmitted to or through the smaller hose 116. As previously pointed out, rubber hose 110 is transversely elastic and can expand and contract in order to dissipate the pulsations as they approach restriction 142. The flexible hose 116 has portions extending in a direction generally transverse of the axis of the hose section 110 and provides for adequate end movement of the transversely expanding and contracting hose portion 119 by bodily deflection of the more limber hose section 116 and causes the system to lend itself to a smooth and quiet behavior.

With respect to Figure 3, a hose 309 of uniform cross section may be provided for connection between the T 300 and a steering gear 210 suitably supplied with pump discharge from T 300. By means of a restriction 342 formed in an internally received fitting 332, the hose 309 may be roughly divided into two substantially equal length portions 310 and 316. A band 334 may be provided to secure the fitting 332 against longitudinal movement respecting the hose. Hose 309 is transversely elastic and is provided with walls 314 fabricated and proportioned to provide appropriate elastic qualities. Portions of these hose sections 310 and 316 extend in directions transverse with respect to each other.

It is highly desirable in the flexible conduits just set forth that the restriction fall at a location substantially equally distant from the extreme ends of the rubber hose conduit. Thus an appropriate section of hose is provided between the restriction and the pump for suitable expanding and absorbing the pulses, and another suitable section of hose is provided between the restriction and the device consuming the pressure fluid, in order to compensate for suitable end movement of the entire rubber hose conduit. Within its broader aspects, however, the invention is not necessarily limited in respect of the interposition of the restriction at a point exactly located half way between the ends of the rubber hose. By the term rubber as used in the specification and claims, is to be understood any rubber-like material of the group comprising latex, neoprene, plastics, synthetics, resins and the like-walled non-metallic materials.

Variations within the spirit and scope of the invention described are equally comprehended by the foregoing description.

What is claimed is:

1. For use in a pressure fluid system including a first liquid-supplied hydraulic device and a positive displacement hydraulic pumping device for supplying said first hydraulic device with a stream of moving liquid, said hydraulic devices having ports adapted to be placed in communication with one another so as to accommodate passage of said stream of moving liquid: a noise-eliminator-type conduit between said ports and comprising a serially-arranged multi-section hose means including at least first and second sections connected in that order effective to conduct a stream of such moving liquid aforesaid in a manner by which pulses in said moving stream of liquid moving therewith due to pumping are eliminated, said first section comprising a transversely expansible rubber hose section having a predetermined inside diameter, said second section comprising a relatively smaller limber hose section having an inside diameter smaller than the predetermined inside diameter of said first section, there being at least a portion of said second section which is bowed and which, by transversely deflecting, operatively accommodates foreshortening of said first section due to transverse expansion of the latter in the course of the pumping operation.

2. For use in a circulatory system for power fluid comprising a pulsation-producing positive-displacement pumping device and a power-motor control-valve-device, said pumping device having associated with it a discharged fluid outlet through which pressure fluid can be supplied from the pumping device, said control valve device having associated with it an inlet to which the pumping device can supply pressure fluid for valve controlled application to the power motor: a multi-sectioned hose means adapted to be connected between the outlet from the pumping device and the inlet of the control valve device and forming a path through which the pump-supplied pulsating fluid can be circulated, said hose means comprising a first and a last section connected so as to be serially arranged and dissipate energy from fluid pulsations, said first section comprising a transversely expansible rubber hose section having a predetermined inside diameter, said last section comprising a relatively smaller limber hose section having an inside diameter smaller than the predetermined inside diameter of said first section, there being at least a portion of said last section which is operatively arranged in a bow and which, by transversely deflecting, accommodates foreshortening of said first section due to vibratory transverse expansion of the latter in the course of the pulsating pumping operation.

3. For use in a circulatory system for power liquid comprising a pulsation-producing positive-displacement pumping device, a power-motor control-valve device, a threaded fitting connected to and communicating with a discharged fluid outlet from said pumping device through which pulsating pressure liquid is supplied by the latter, and a threaded fitting connected to and communicating with an inlet to said power-motor control-valve device to which the pumping device can supply pressure liquid for the valve-controlled application thereof to the power motor, said threaded fittings being spaced apart from one another with a predetermined distance therebetween: a multi-section hose assembly of an overall length in excess of said predetermined distance between threaded fittings for forming a noise-eliminator path through which the pump-supplied pulsating liquid can be circulated, said hose assembly comprising in combination, a first and a last section connected so as to be serially arranged and cooperate in dissipating energy from pumped pulsating liquid, a hose fitting carried by the first section at its outer end for threadably connecting the same to said pump-outlet-connected fitting, and a hose fitting carried by the last section at its outer end for threadably connecting the same to said valve-inlet-connected fitting, said first section being constituted by a transversely expansible rubber hose section having a predetermined inside diameter, said last section being constituted by a relatively smaller hose section having an inside diameter smaller than the predetermined inside diameter of said first section, and being of a limber construction and bowed so as to have a bodily offset portion for transversely deflecting to accommodate foreshortening of said first section due to vibratory transverse expansion of the latter in the course of the pulsating pumping operation.

4. For use in a pressure fluid system including a first hydraulically operated device and a second hydraulic pumping device for supplying said first hydraulically operated device with a stream of pressurized moving liquid, said hydraulic devices having ports adapted to be placed in communication with one another so as to accommodate passage therebetween of said stream of moving liquid; a noise-eliminator-type conduit connectible between said ports and comprising a multi-section hose means including at least first and second series arranged sections, said first section receiving the discharge from said pumping device and passing it to said second hose section and comprising a transversely expansible rubber-like hose section having a predetermined inside diameter, said second section comprising a readily flexible hose section having an inside diameter smaller than the predetermined inside diameter of said first section and being arranged with a bowed portion intermediate its ends when installed between said hydraulic devices, said bowed portion providing a hose portion adapted to be readily reshaped to operatively accommodate foreshortening of said first hose section due to transverse expansion of the latter under pulsations occurring during the transfer of pressurized liquid between said devices.

5. For use in a pressure fluid system including a first hydraulically operated device and a second hydraulic pumping device for supplying said first hydraulically operated device with a stream of pressurized moving liquid, said hydraulic devices having ports adapted to be placed in communication with one another so as to accommodate passage therebetween of said stream of moving liquid; a noise-eliminator-type conduit connectible between said ports and comprising a multi-section hose means including at least first and second series arranged sections, said first section receiving the discharge from said pumping device and passing it to said second hose section and comprising a transversely expansible rubber-like hose section having a predetermined inside diameter, said second section comprising a readily flexible hose section having an inside diameter smaller than the predetermined inside diameter of said first section and being arranged with a portion intermediate its ends that extends at an angle to said first section when said conduit is installed between said hydraulic devices, said intermediate portion of said second section providing a hose portion adapted to be readily rearranged to operatively accommodate foreshortening of said first hose section due to transverse expansion of the latter under pulsations occurring during the transfer of pressurized liquid between said hydraulic devices.

(References on following page)

References Cited in the file of this patent

UNITED STATES PATENTS

| Number | Name | Date |
|---|---|---|
| 748,301 | Nicholls | Dec. 29, 1903 |
| 752,175 | Monnier | Feb. 16, 1904 |
| 807,595 | Brewer | Dec. 19, 1905 |
| 2,163,892 | Sanford et al. | June 27, 1939 |
| 2,170,890 | Allen | Aug. 29, 1939 |
| 2,261,028 | Hopkins | Oct. 28, 1941 |
| 2,261,948 | Beach | Nov. 11, 1941 |
| 2,402,449 | Rockwell | June 18, 1946 |
| 2,417,701 | Parsons | Mar. 18, 1947 |
| 2,477,436 | Bannister | July 26, 1949 |
| 2,603,065 | Sarto | July 15, 1952 |

FOREIGN PATENTS

| Number | Country | Date |
|---|---|---|
| 231,112 | Great Britain | Mar. 26, 1925 |
| 253,307 | Great Britain | June 17, 1926 |
| 711,203 | France | Sept. 5, 1931 |
| 878,805 | France | Feb. 4, 1943 |